(12) United States Patent
Yamaguchi et al.

(10) Patent No.: US 7,497,284 B2
(45) Date of Patent: Mar. 3, 2009

(54) POWER CABLE HOLDING STRUCTURE FOR VEHICLE AND METHOD OF ASSEMBLING POWER CABLE ASSEMBLY FOR VEHICLE

(75) Inventors: Hiroo Yamaguchi, Utsunomiya (JP); Akiyoshi Yamamoto, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 814 days.

(21) Appl. No.: 11/042,204

(22) Filed: Jan. 26, 2005

(65) Prior Publication Data
US 2005/0162015 A1 Jul. 28, 2005

(30) Foreign Application Priority Data
Jan. 28, 2004 (JP) .............................. 2004-019888

(51) Int. Cl.
*B60K 1/00* (2006.01)
(52) U.S. Cl. ...................... 180/65.1; 174/135
(58) Field of Classification Search .................. 174/48, 174/49, 68.1, 68.3, 135, 507; 180/65.1, 65.2, 180/65.3, 65.5, 271; 62/228.4, 505, 259.2
See application file for complete search history.

(56) References Cited

U.S. PATENT DOCUMENTS

| | | | | |
|---|---|---|---|---|
| 3,909,501 A | * | 9/1975 | Johnsen | 174/15.6 |
| 6,220,380 B1 | * | 4/2001 | Mita et al. | 180/65.1 |
| 6,460,642 B1 | * | 10/2002 | Hirano | 180/65.1 |

FOREIGN PATENT DOCUMENTS

| | | |
|---|---|---|
| CN | 2473723 Y | 1/2002 |
| DE | 3603849 A1 | 8/1987 |
| EP | 0708287 A1 | 4/1996 |
| JP | 5-207610 | 8/1993 |
| JP | 09-172713 | 6/1997 |
| JP | 10-112349 | 4/1998 |
| JP | 2000-092616 | 3/2000 |
| JP | 2000-152470 | 5/2000 |
| JP | 2001-136632 | 5/2001 |
| JP | 2001-339837 | 12/2001 |
| JP | 2002-051403 | 2/2002 |
| JP | 2003-252126 | 9/2003 |

* cited by examiner

*Primary Examiner*—Rajnikant B Patel
(74) *Attorney, Agent, or Firm*—Arent Fox LLP

(57) ABSTRACT

A power cable holding structure for a vehicle in which compressor power cables having a small outer diameter are disposed in the gaps between the outer surface of motor power cables having a large outer diameter and the inner surface of a protective pipe. Also, a method of assembling a power cable assembly comprising the steps of: inserting the other end side of the power cables with first connectors attached into one end portion into the protective pipe; disposing the small diameter compressor power cables in the gaps between the outer surface of the large diameter power cables and the inner surface of the protective pipe; and after applying bending work to the protective pipe in this state, adjusting the lengths of the other end portions of the power cables and attaching second connectors.

14 Claims, 10 Drawing Sheets

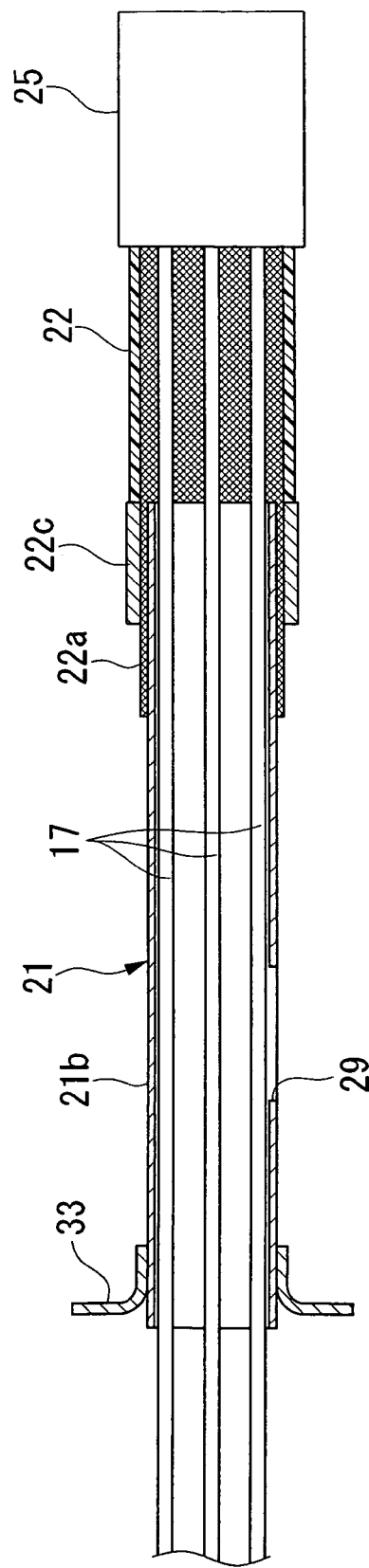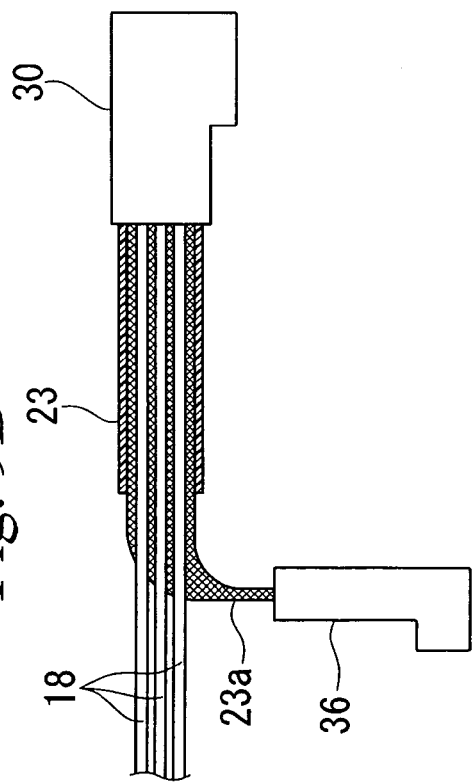

POWER CABLE HOLDING STRUCTURE FOR VEHICLE AND METHOD OF ASSEMBLING POWER CABLE ASSEMBLY FOR VEHICLE

BACKGROUND OF THE INVENTION

1. Field of the Invention

The present invention relates to a power cable holding structure for a vehicle for holding power cables in a vehicle that can be powered by electricity and a method of assembling the power cable assembly for a vehicle.

Priority is claimed on Japanese Patent Application No. 2004-19888, filed Jan. 28, 2004, the content of which is incorporated herein by reference.

2. Description of Related Art

Because of the large diameter and resulting heavy load of power cables that supply power from a power supply such as a battery to the motor for traveling and driving in an electric vehicle, various proposals have heretofore been made for holding structures to retain the power cables (for example, Japanese Unexamined Patent Application, First Publication No. H05-207610).

Compressors for air conditioners in some vehicles that can be powered by electricity, such as hybrid electric vehicles, have in recent years been constituted as an electric compressor that is driven by the engine when the engine runs and is driven by electric power supplied from a power supply such as a battery when the engine idles. Although the power cables supplying power to this compressor, in relation to the impressed voltage, normally have a smaller diameter compared to the motor power cables, as a holding structure for these cables, it is desirable to give consideration to their effect on the space above the floor (cabin space) and workability and the like when fitting the power cables to the vehicle body.

The present invention was conceived in view of the above circumstances and, in a power cable holding structure for a vehicle, has as its object minimizing effects on the space above the floor as well as enhancing workability when fitting the power cables, and, in a method of assembling the power cable assembly for a vehicle to realize this, has as its object improving the productivity.

SUMMARY OF THE INVENTION

As a means for solving the aforementioned problem, a first aspect of the present invention is a power cable holding structure for a vehicle that holds power cables provided in a vehicle that can be powered by electricity in a state of insertion in a metal protective pipe having power cables having at least two different outer diameters and including at least two cables for each outer diameter and a metal protective pipe in which the power cables are inserted. In the protective pipe, the power cables having a small outer diameter are disposed in the gaps between the outer surface of the power cables having a large outer diameter and the inner surface of the protective pipe.

A second aspect of the present invention is a power cable holding structure for a vehicle used in a vehicle that can be powered by electricity having an engine and a motor for traveling and driving, an electric compressor, a first electrical power converter for rotation control of the motor, and a second electrical power converter for rotation control of the electric compressor. In the structure of this aspect, the motor disposed in the engine compartment and the first electrical power converter disposed outside the engine compartment are connected by motor power cables lain along the undersurface of the floor, and the electric compressor disposed in the engine compartment and the second electrical power converter disposed outside the engine compartment are connected by compressor power cables lain along the undersurface of the floor. The compressor power cables have a smaller outer diameter than the motor power cables. The motor power cables and the compressor power cables are accommodated in a metal protective pipe. The compressor power cables are disposed in the gaps between the outer surface of the motor power cables and the inner surface of the protective pipe.

According to this constitution, power cables with different external diameters can be efficiently disposed in a protective pipe, thereby enabling the size of the protective pipe to be minimized. In addition, inserting the power cables in a metal protective pipe enables the cables to be lain along the undersurface of the floor in the space under the floor (space outside the cabin). Furthermore, the metal protective pipe functions as an electromagnetic shield, thereby enabling the adoption of nonshielded cables as the power cables.

In the engine compartment, it is preferable to provide a flexible protective tube in which the motor power cables are inserted in a prescribed range from the motor.

In the engine compartment, it is preferable to provide a flexible protective tube in which the compressor power cables are inserted in a prescribed range from the electric compressor.

The constitution enables the power cables to be easily routed near the motor or the electric compressor in the engine compartment. In addition, the protective tubes can absorb dimensional errors arising from laying of the power cables as well as prevent the transmission of engine vibrations and the like to the protective pipe.

The present aspect may be constituted so that an opening is provided in the middle section of the protective pipe in the engine compartment, with the engine compartment side of the compressor power cables from the middle section in the engine compartment drawn to the outside of the protective pipe through the opening, and a flexible protective tube (a branch line protective tube) that passes the compressor power cables is provided outside the protective pipe. In this case as well, the power cables can similarly be easily routed near the motor or the electric compressor in the engine compartment. In addition, it can absorb dimensional errors arising from laying of the cables as well as prevent the transmission of engine vibrations and the like to the protective pipe.

The protective tube and the branch line protective tube are preferably resin tubes provided with a metal corrugated tube or metal braided shield on its inner surface.

According to this constitution, the protective tube can be made to function as an electromagnetic shield, thereby enabling the adoption of nonshielded cables as the power cables.

In the present aspect, it is preferable to further provide a holder that seals the gap between the opening and the compressor power cables and holds the compressor power cables near the opening.

According to this constitution, along with the seal in the protective pipe being maintained, the branch start portion of the branched compressor power cables does not contact the rim of the opening.

The present aspect may be constituted so that the protective tube has a braided shield on its inner surface, a shield passage hole that passes this braided shield is provided at the holder, a rigid terminal is provided at the tip of the braided shield, inserted in the shield passage hole and fastened to the fixed portion of the protective pipe.

According to this constitution, grounding is ensured by the braided shield in the protective tube.

A third aspect of the present invention is a method of assembling a power cable assembly for a vehicle, in which at least two power cables having mutually different diameters provided in a vehicle that can be powered by electricity are inserted in a metal protective pipe. In this method, terminals are attached to one end of each of the power cables, and the other end of each of the power cables is inserted inside the protective pipe from one end side. In the protective pipe, the power cables with a small diameter are disposed in the gaps between the outer surface of the power cables with a large diameter and the inner surface of the protective pipe. In the state of the other end of each of the power cables drawn out from the other end side of the protective pipe, after the protective pipe is bent along the laying route, the lengths are adjusted with respect to the other end of each of the power cables and terminals are attached.

According to this constitution, power cables with different external diameters are efficiently disposed in a protective pipe, enabling the size of the protective pipe to be minimized. In addition, inserting the power cables in a metal protective pipe enables the cables to be run in the space under the floor (space outside the cabin). Furthermore, it is possible to adopt nonshielded cables as the power cables.

In addition, by inserting each power cable in the protective pipe while in a straight state before bending work is applied, insertion of the power cables is easy even in the case of long protective pipes. After bending work is applied to the protective pipe in the state with the power cables inserted, the length of each cable is adjusted and terminals and a connector are attached, thereby ensuring no shifting of the lengths of the power cables with respect to the protective pipe due to bending work of the protective pipe.

Since the power cables are passed through the protective pipe before attaching terminals and connector to the other ends of the power cables, the size of the protective pipe need only be large enough to allow insertion of the cables but not insertion of the terminals.

The power cable holding structure for a vehicle of the present invention allows for reduction in size and weight of the protective pipe.

Also, laying the cables under the floor enhances workability when installing the power cables and prevents cramping of the cabin space. Moreover, adoption of nonshielded cables allows reduction in size and weight of each cable.

The power cable holding structure for a vehicle of the present invention can improve the laying workability for the power cables. It can furthermore minimize stiffness of the protective pipe and contribute to weight savings.

The power cable holding structure for a vehicle of the present invention can branch off the compressor power cables to the outside of the protective pipe without impairing the electromagnetic shielding function of the protective pipe. Also, damage to the branch start portion of the compressor power cables 18 can be reliably prevented.

The power cable holding structure for a vehicle of the present invention can ensure grounding of the power cables.

According to the method of assembling a power cable assembly for a vehicle of the present invention, power cables can be easily inserted into the protective pipe even when it is long. Also, the lengths of the power cables led out from the protective pipe can be optimized without being affected by the bending work of the protective pipe. In addition, the size of the protective pipe can be minimized, thereby allowing a reduction in size and weight of the protective pipe.

BRIEF DESCRIPTION OF THE DRAWINGS

FIGS. 9A and 9B are first diagrams showing the procedure for assembling the power cable assembly.

DETAILED DESCRIPTION OF THE INVENTION

Figure 1:
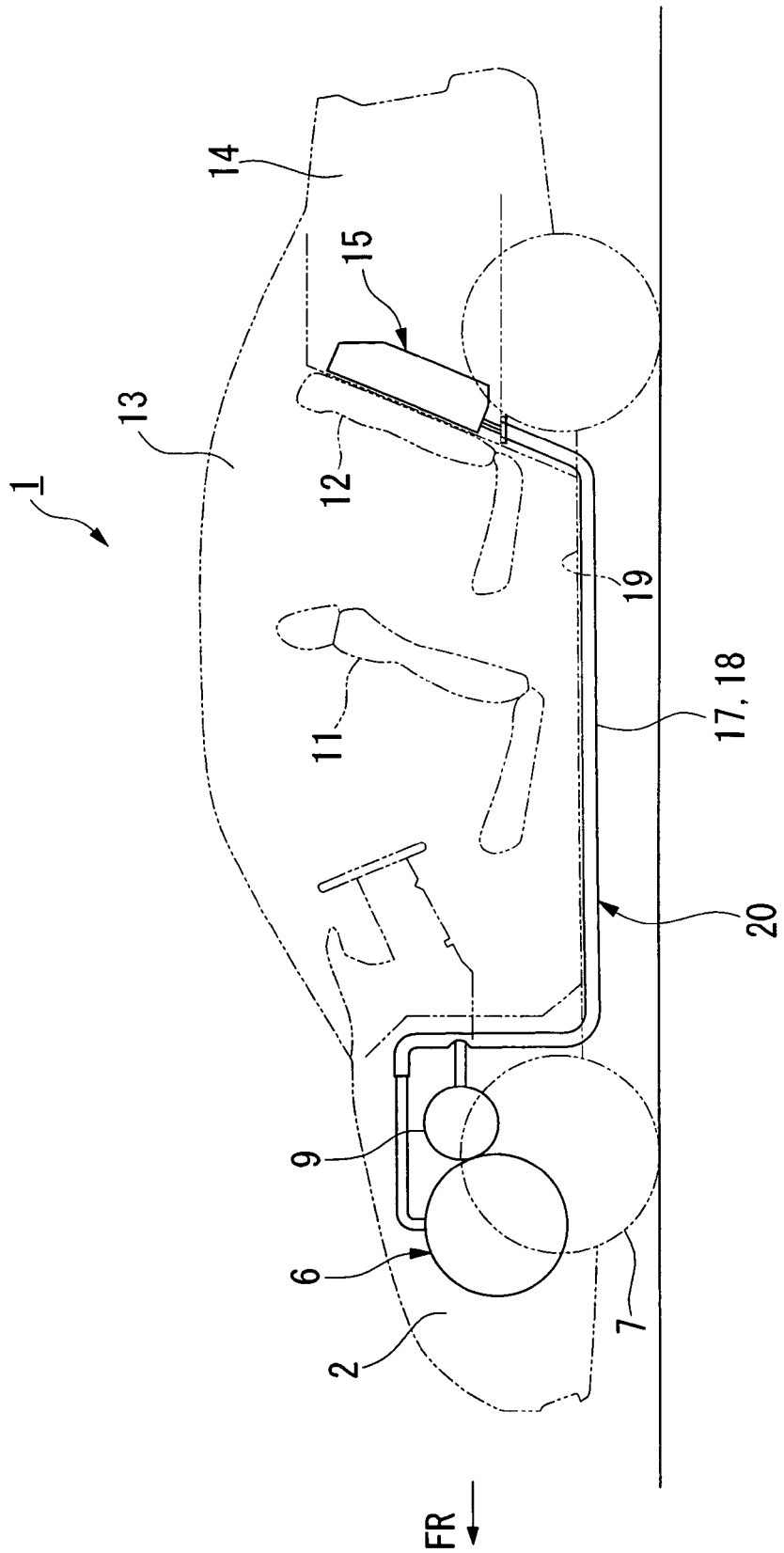
FIG. 1 is a side view showing of a hybrid electric vehicle in the embodiments of the present invention.

The embodiments of the present invention are explained below referring to the drawings. If not particularly stated, orientations such as front, back, left and right are the same as orientations with respect to the vehicle. The arrow next to "FR" in the drawings indicates the front of the vehicle, and the arrow next to "LH" points to the left side of the vehicle.

Figure 2:
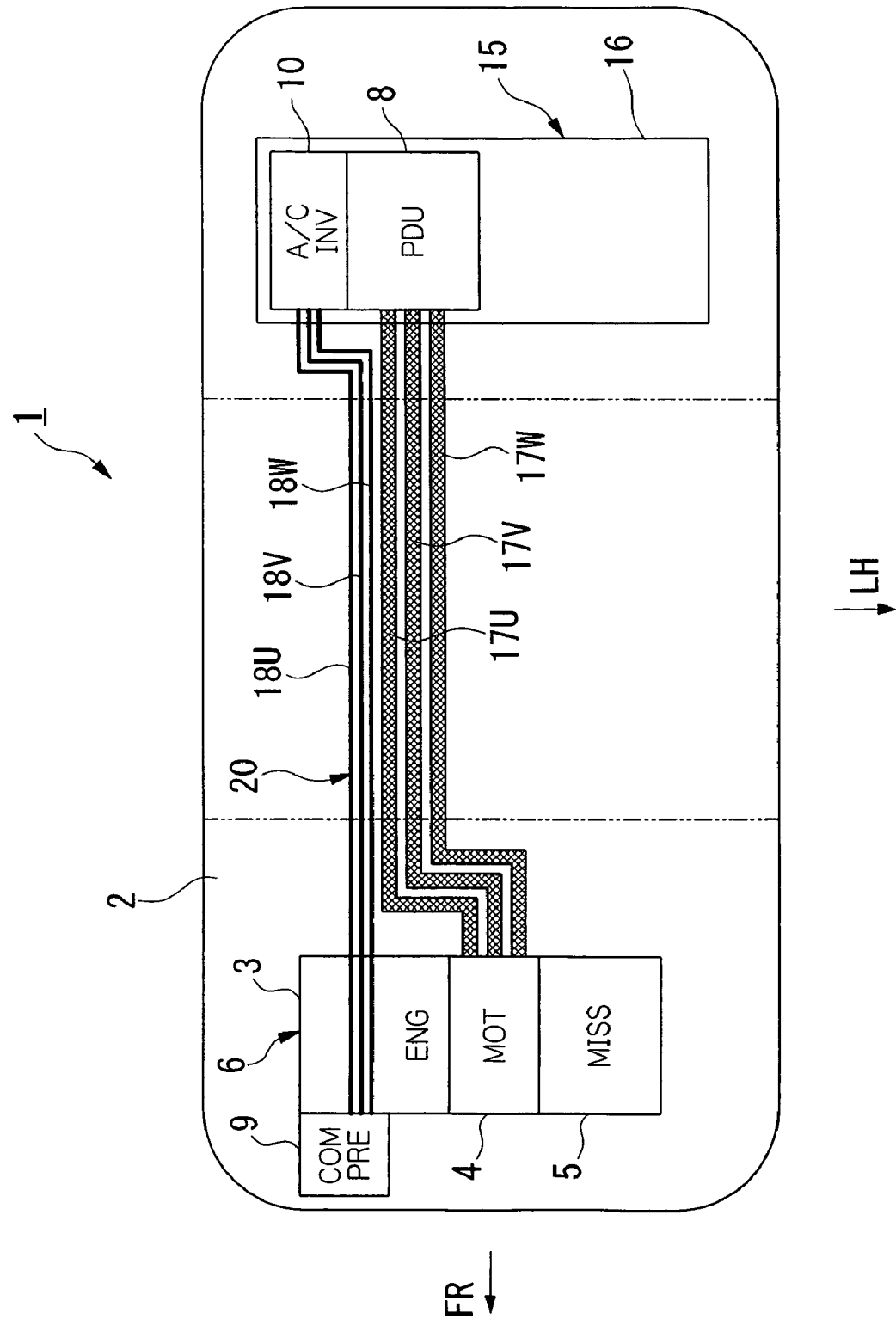
FIG. 2 is a block diagram showing the main parts of the hybrid electric vehicle.

In FIGS. 1 and 2, reference numeral 1 denotes a so-called parallel-type hybrid electric vehicle (vehicle that can be powered by electricity).

The engine compartment 2 in the front portion of the body of this hybrid electric vehicle 1 is provided with an engine 3, a motor generator 4 (motor), and an automatic transmission 5 in series constituting a power unit 6. The motor generator 4 is a three-phase DC brushless motor, and the driving force of this motor generator 4 and the engine 3 is transmitted to the front wheels 7 that are the drive wheels via the automatic transmission 5.

When the driving force is transmitted from the wheels 7 to the motor generator 4 during deceleration and the like of the hybrid electric vehicle 1, the motor generator 4 functions as a generator to produce so-called regenerative braking force, so that kinetic energy of the vehicle is recovered as electrical energy. The recovered electrical energy is then stored via an inverter for the motor (first electrical power converter) 8 in an energy storage unit not shown that includes a battery and a capacitor and the like.

An electric compressor 9 for the air conditioner is provided in the power unit 6.

This electric compressor 9 has a compressor motor not shown. The drive shaft of this compressor motor can be linked by the crankshaft and belt of the engine 3 and the clutch. The compressor motor is a three-phase motor, and when the electric compressor 9 is driven by the compressor motor, electrical power is supplied from the compressor inverter (second electrical power converter) 10 to the compressor motor.

Located behind the engine compartment 2 is the cabin 13 in which are arranged the front seats 11 and backseat 12. In the rear of the vehicle is the trunk 14, which is separated from the cabin 13 via a partition and the like. The engine compartment 2 is outside the cabin, while the trunk 14 is in the cabin. On the back side of the seat back of the backseat 12, in the trunk 14, is disposed a box-shaped electrical unit 15 along the seat back.

In box-shaped case 16 of the electrical unit 15 are housed an energy storage unit not shown along with the motor inverter 8 that performs rotation control of the motor generator 4 and compressor inverter 10 that performs rotation control of the electric compressor 9. The motor inverter 8 and the compressor inverter 10 receive direct current electricity from the energy storage unit and convert it to three-phase alternating current electricity, which is fed to the motor generator 4 or the electric compressor 9 to drive them. In the motor inverter 8, by converting regenerative current from the motor generator 4 to direct current it can be stored in the energy storage unit.

The motor generator 4 and the motor inverter 8 are connected by power cables 17U and 17V and 17W for a three-phase motor. Similarly, the electric compressor 9 and the compressor inverter 10 are connected by power cables 18U and 18V and 18W for a three-phase compressor. When there is no need to distinguish between phases below, the motor power cables are marked by reference numeral 17, and the compressor power cables are marked by reference numeral 18.

The motor power cables 17 and compressor power cables 18 are run from the engine compartment 2 along the space under the floor 19, that is, space outside the cabin space, so as to follow the undersurface of the floor 19. In the rear of the vehicle the cables pass through the floor 19 are connected to the electrical unit 15 in the trunk 14 (in the cabin). The motor power cables 17 and the compressor power cables 18 are integrally held and fastened to the vehicle body as power cable assembly 20.

Figure 3:
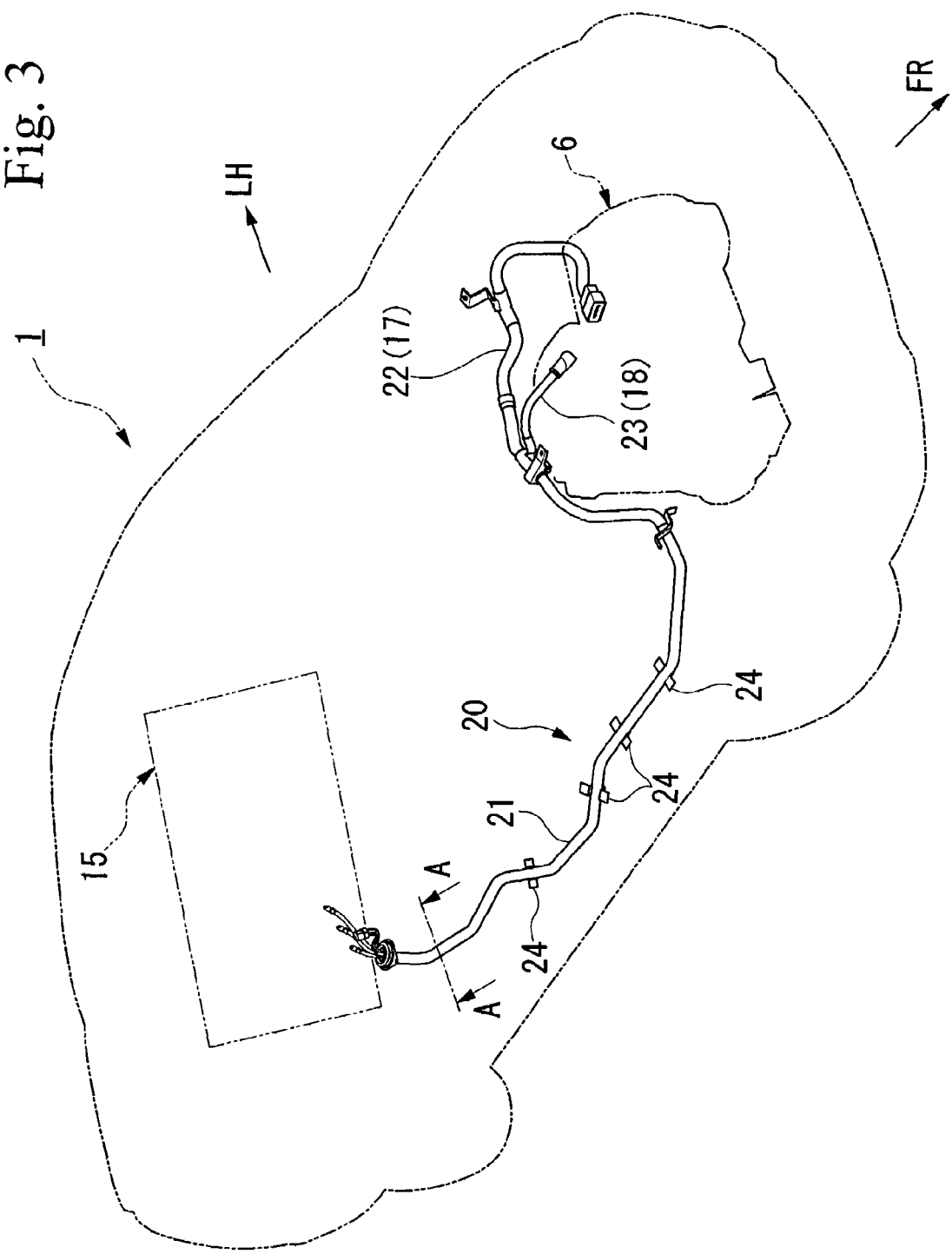
FIG. 3 is a perspective view showing the entire power cable assembly.

As shown in FIG. 3, in the power cable assembly 20, the motor power cables 17 and the compressor power cables 18 are inserted in the metal (for example aluminum) protective pipe 21 to which bending work is applied along the laying route in the space under the floor. At the engine compartment 2 side region of the power cable assembly 20, after laying the protective pipe 21 near the power unit 6, the power cables 17 and 18 respectively covered with flexible resin tubes 22 and 23 are extended so as to be respectively connected to the cable coupling portion of the motor generator 4 or the cable coupling portion of the electric compressor 9.

At the trunk 14 side of the power cable assembly 20, the end of the protective pipe 21 is connected in a close state and fastened to the floor 19 at a position directly below the electrical unit 15. The power cables 17 and 18 are drawn out from the protective pipe 21 for connection to the electrical unit 15.

The power cable assembly 20 is in this way fastened to the bottom surface of the floor 19 by a plurality of retaining brackets 24.

Figures 4A, 4B:
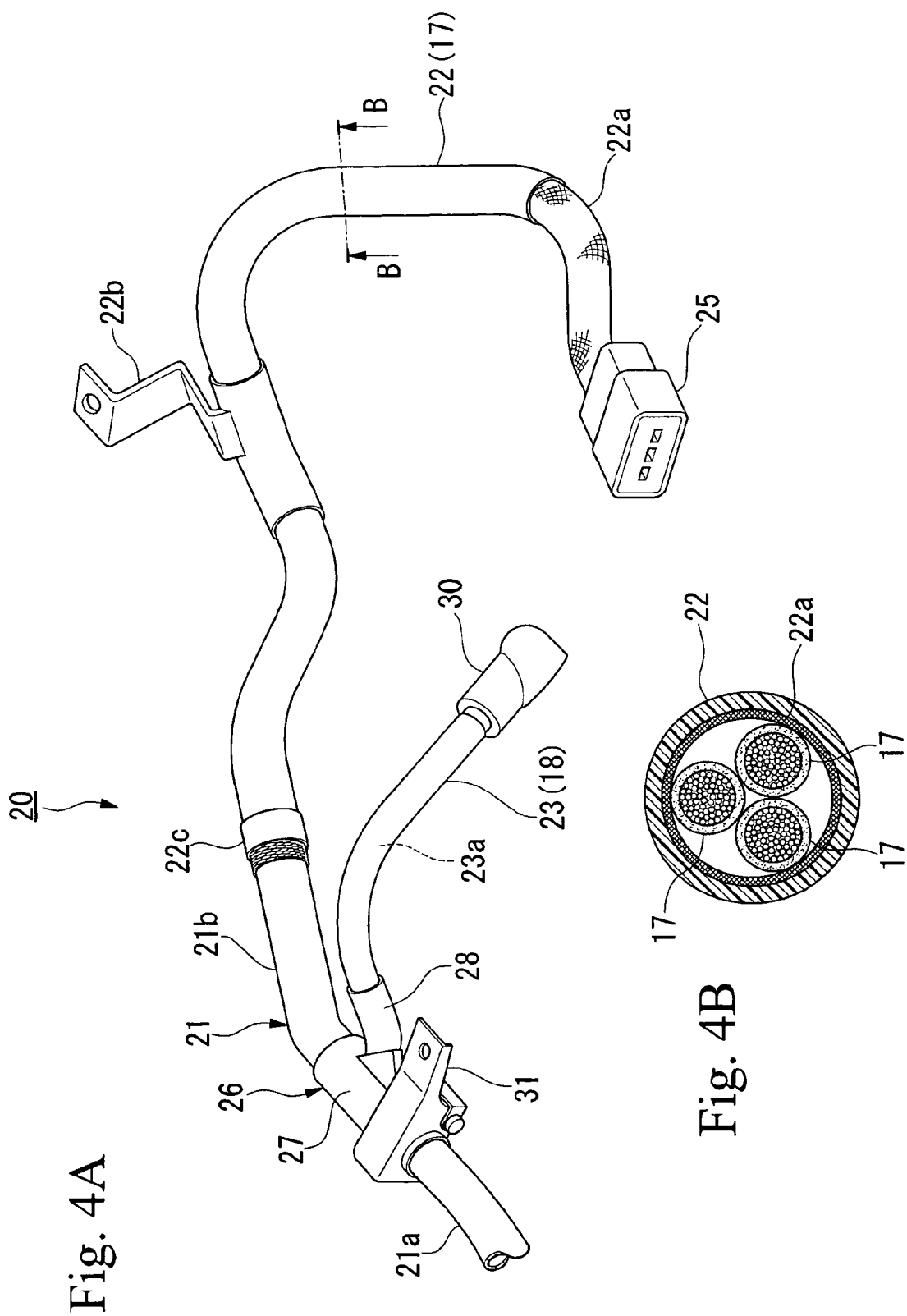
FIG. 4A is a perspective view showing the end area of the engine compartment side of the power cable assembly.
FIG. 4B is a cross-sectional view along the line B-B in FIG. 4A.

As shown in FIGS. 4A and 4B, at the engine compartment 2 side (power unit 6 side) end of the protective pipe 21 is fixed one end portion of the flexible resin protective tube 22 having inside a braided shield 22a formed by braiding of metallic wire. The motor power cables 17 inserted inside this protective tube 22 are extended to the cable coupling portion of the motor generator 4 while bypassing the power unit 6. Motor connector 25 is connected to the tips of the motor power cables 17 at the power unit 6 side. The motor power cables 17 are connected to the cable coupling portion of the motor generator 4 via this motor connector 25. Reference symbol 22b refers to a retaining bracket for fixing a substantially middle section of the protective tube 22, as viewed in the longitudinal direction thereof, to the vehicle body.

At the other end portion (power unit 6 side end) of the protective tube 22, the resin covering is removed between a position at a prescribed spacing from the motor connector 25 and the motor connector 25. That is, in this portion, the motor power cables 17 are only covered by the braided shield 22a. By this constitution, the vicinity of the motor connector 25 of the protective tube 22 becomes easily deformable, simplifying connection/disconnection of the motor connector 25 to/from the motor generator 4. The engine compartment 2 side end of the braided shield 22a is connected to the ground terminal of the motor connector 25. By connecting the electrical unit 15 side end of the braided shield 22a to the protective pipe 21, the protective pipe 21 is grounded. Between the (power unit 6 side) other end portion of the protective tube 22 and the motor connector 25, the braided shield 22a may be constituted to be covered with a rubber tube and the like.

A resinous holder 26 is attached to an area of the protective pipe 21 spaced by a prescribed amount from the end portion of the engine room 2 side to the cabin side (trunk 14 side) in the lengthwise direction (middle portion of the protective pipe 21). This holder 26 has a circular main body 27 through which the protective pipe 21 passes and a branch 28 that protrudes outwardly at an angle from the main body 27 toward the engine compartment 2 side of the protective pipe 21. An opening 29 is formed in the protective pipe 21 at the position where the main body 27 of the holder 26 is attached. From this opening 29, the compressor power cables 18 pass through the branch 28 of the holder 26 and are drawn to the outside of the protective pipe 21 by branching away from the protective pipe 21.

One end portion of flexible resin protective tube 23 having around its inside a braided shield 23a formed by braiding of metallic wire similar to that of protective tube 22 is fixed to the end portion of the branch 28. The compressor power cables 18 are inserted into the protective tube 23. Compressor connector 30 to which each phase of the compressor power cables 18 are connected is provided at the other end of the protective tube 23. The compressor power cables 18 are connected to the cable coupling portion of the electric compressor 9 via this compressor connector 30. The braided shield 23a is connected to the ground terminal of the compressor connector 30.

Reference numeral 31 denotes a retaining bracket for fastening the region of the protection pipe 21 on the cabin 13 side of the holder 26 to the vehicle body.

Figure 5:
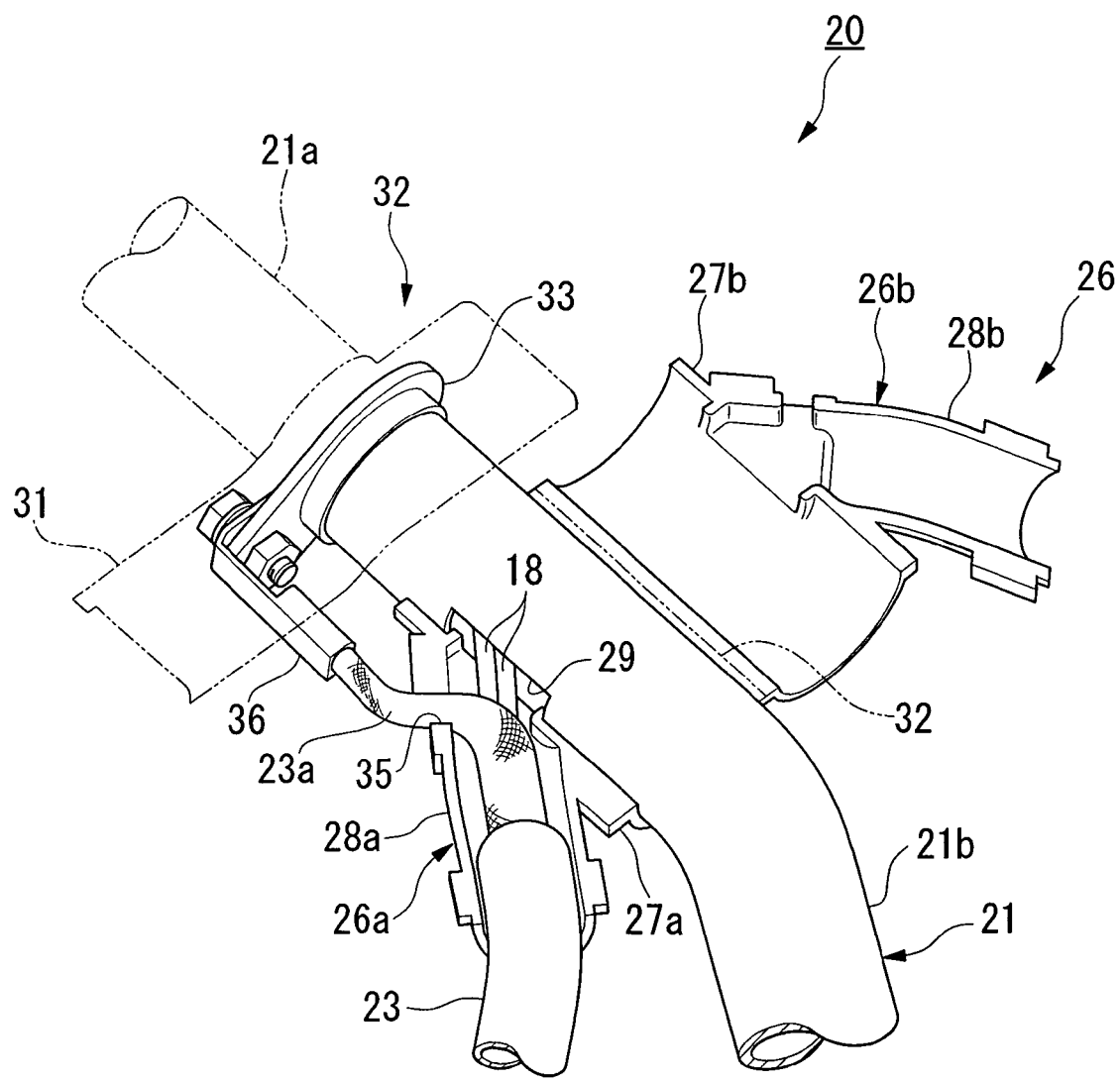
FIG. 5 is a perspective view showing the holder area of the power cable assembly.

As shown in FIG. 5, the holder 26 is divided into a pair of holder halves 26a and 26b along a partition surface parallel to the axis line of the protective pipe 21. The main body 27 and the branch 28 of the holder 26 are respectively divided into main body halves 27a and 27b and branch halves 28a and 28b along the partition surface parallel to the axis line of the protective pipe 21. By connecting the main body half 27a and the main body half 27b with a flexible part 32, the holder 26 constitutes an openable, closeable clamp-shaped member along the flexible part 32. After setting the protective pipe 21 and the compressor power cables 18 in the holder half 26a in the open state of the holder halves 26a and 26b, it is merged with the other holder half 26b to close the holder 26. Binding holder halves 26a and 26b together by a latch or the like fixes the holder 26 to the protective pipe 21 and compressor power cable 18 in a state of sandwiching them.

An opening 29 that is for example rectangular from the front view is made in the section of the protective pipe 21 covered by the holder 26. The compressor power cables 18 inserted in the protective pipe 21 can be extracted from this opening 29. The protective pipe 21 is partitioned at an area on the cabin side of the holder 26 by divider 32. At the juncture of this divider 32, the protective pipe 21 is partitioned into protective pipe body 21a that is the principal component and partitioned pipe 21b to which the holder 26 is attached.

Figure 11:
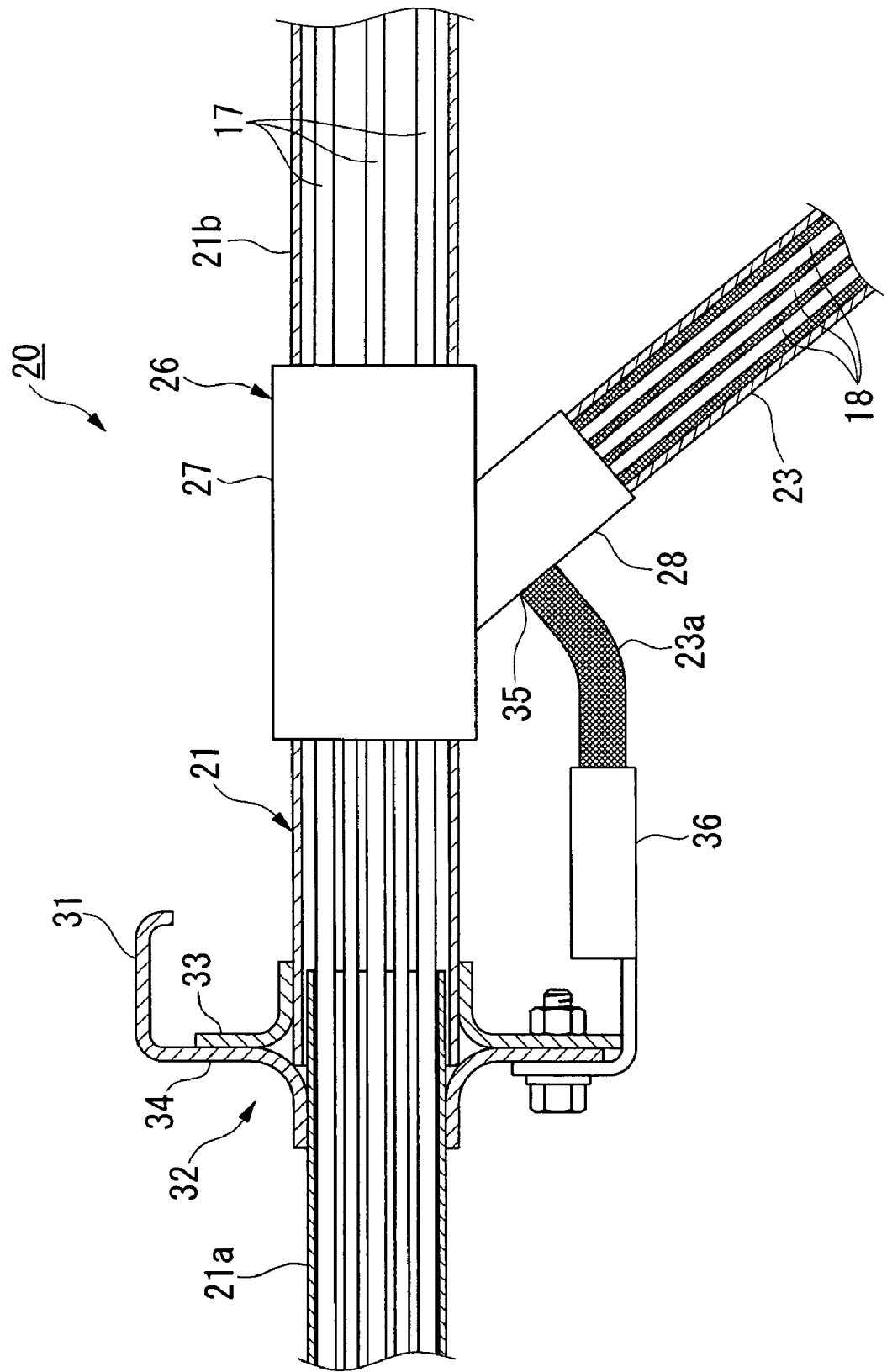
FIG. 11 is a third diagram showing the procedure for assembling the power cable assembly.

Explaining with reference to FIG. 11, at the cabin-side end portion of partitioned pipe 21b, flange bracket 33 for coupling with the protective pipe body 21a is joined, while at the engine compartment side portion of the protective pipe body 21a, flange bracket 34 for coupling with the partitioned pipe 21b is joined. By abutting these flange brackets 33 and 34 and bolt/nut fastening them, the protective pipe body 21a and the partitioned pipe 21b are integrally coupled. The flange bracket 34 is constituted integrally with the retaining bracket 31.

The braided shield 23a of the protective tube 23 covering the compressor power cables 18 is provided to be longer than the resin covering portion of the protective tube 23. This braided shield 23a is removed from the compressor power cables 18 at the branch 28 of the holder 26 and drawn to the outside the branch 28 (holder 26) through a shield passage hole 35 provided on the side of the branch 28. Rigid terminal 36 is provided at the tip of the braided shield 23a drawn out from the shield passage hole 35. By bolt/nut fastening the flange bracket 34 of the protective pipe body 21a and the flange bracket 33 of the partitioned pipe 21b, the rigid terminal 36 is fastened to both flange brackets 33 and 34. The area where the flange brackets 33 and 34 are provided on the protective pipe 21 can be called the fixed portion where it is fastened to the vehicle body by the retaining bracket 31.

Figure 6:
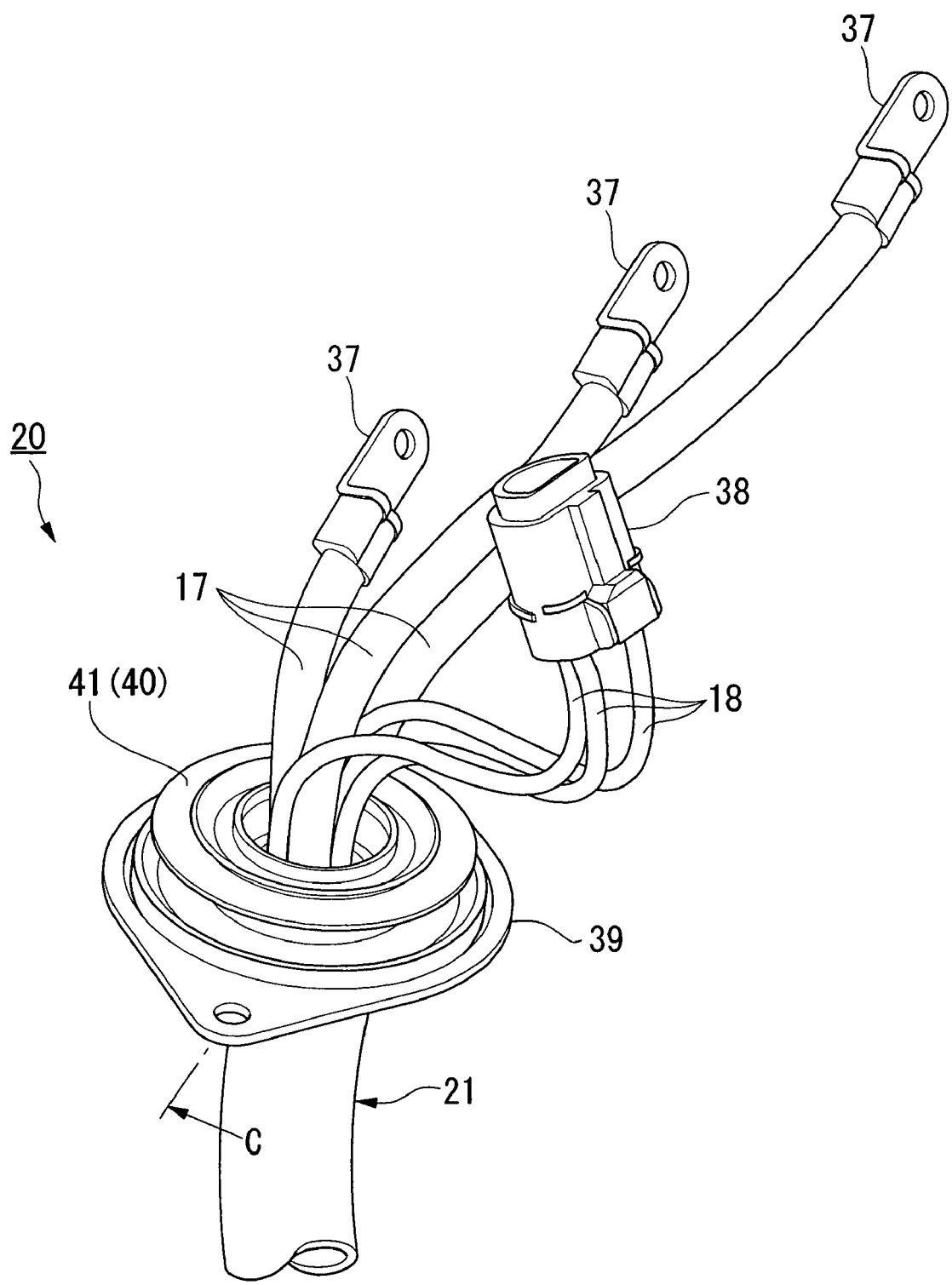
FIG. 6 is a perspective view showing the end area of the trunk side of the power cable assembly.

As shown in FIG. 6, the power cables 17 and 18 are extracted from the trunk 14 side end portion of the protective pipe 21. Terminals 37 are provided at the ends of the motor power cables 17 for connection to the motor inverter 8. Connector 38 is provided at the ends of compressor power cables 18 for joint connection to the compressor inverter 10.

Figure 7A:
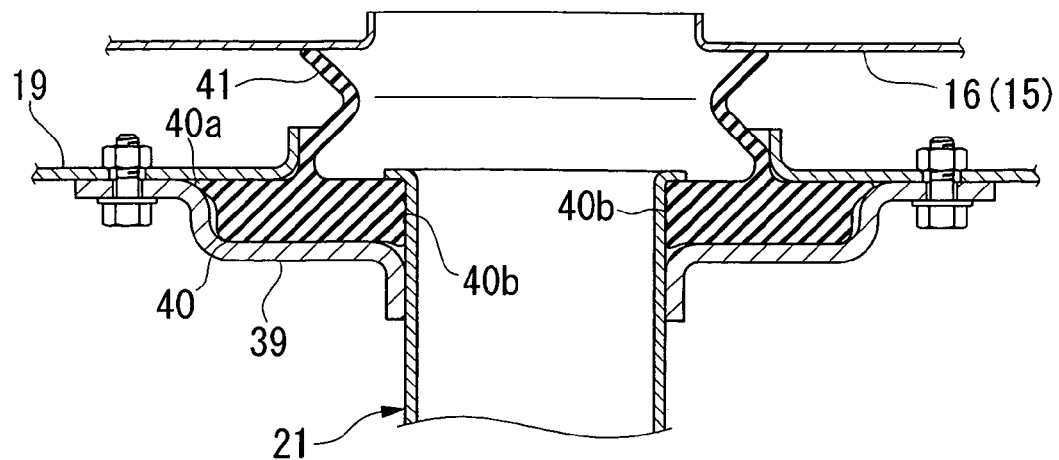
FIG. 7A is a cross-sectional view along the line C in FIG. 6.

As shown in FIG. 7A, at the trunk 14 side end of the protective pipe 21, flange bracket 39 is connected for fastening the protective pipe 21 to the floor 19. A rubber grommet 40 is disposed on the inner side of this flange bracket 39. The end of the protective pipe 21 is fastened to the floor 19 by sandwiching the grommet 40 and bolt/nut fastening the flange bracket 39 and the floor 19.

Figure 7B:
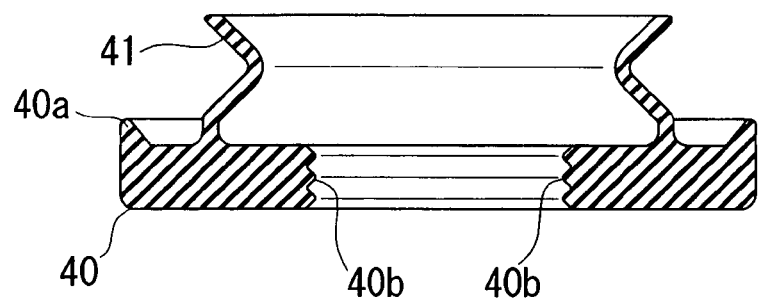
FIG. 7B is a cross-sectional view corresponding to the grommet unit of FIG. 7A.

The grommet 40 is a disc-like object sandwiched between the flange bracket 39 and the floor 19 that passes the protective pipe 21. As shown in FIG. 7B, a seal protrusion 40a facing upward (floor 19 side) is provided at the periphery of the grommet 40 for close contact with the undersurface of the floor 19. Seal bumps 40b for making close contact with the outer periphery of the protective pipe 21 are formed on the inner circumference of the passage hole of the grommet 40 that passes the protective pipe 21. The seal protrusion 40a and seal bumps 40b deform to form a seal surface, by which at the attaching section area between the floor 19 and the protective pipe 21 the inside of the floor 19 is sealed with respect to the outside.

Elastic lip 41 is provided at the area of the trunk 14 side of the grommet 40. This elastic lip 41 is inserted in the trunk 14 from the opening formed in the floor 19. The tip of the elastic lip 41 makes close contact with the undersurface of the case 16 of the electrical unit 15 disposed at a prescribed gap above the floor 19. An opening is made also in the undersurface of the case 16 of the electrical unit 15 that the elastic lip 41 makes close contact with. In this way, the interior of the protective pipe 21 and the interior of the case 16 of the electrical unit 15 are communicated with each other in a state of being shut off from outside. Passing through here, the power cables 17 and 18 extracted from the protective pipe 21 are connected to the inverters 8 and 10 of the electrical unit 15.

Figure 8:
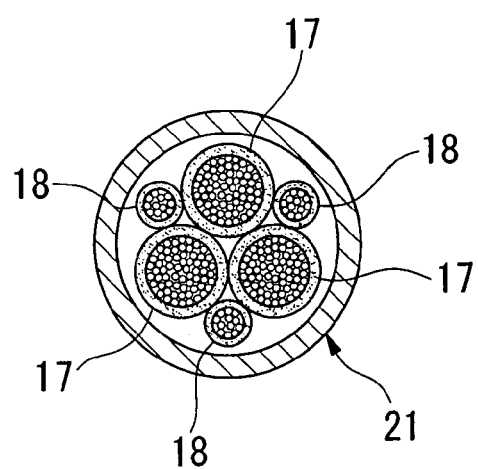
FIG. 8 is a cross-sectional view along the line A-A in FIG. 3 and shows the arrangement of the power cables in the protective pipe.

As shown in FIG. 8, the power cables 17 and 18 are non-shielded cables whose conductors are covered with insulating material. The motor power cables 17 have a large diameter because high voltages are applied to them and they have a larger diameter than the compressor power cables 18, across which comparatively lower voltages are applied. In the round protective pipe 21, the comparatively large diameter three-phase motor power cables 17 are positioned in the central portion of the protective pipe 21, with the comparatively small diameter compressor power cables positioned in the gaps formed between the outer surface of the bunch of the motor power cables 17 and the inner surface of the protective pipe 21.

The power cables 17 and 18 are efficiently disposed with this disposition, and the interior space of the protective pipe 21 is effectively utilized. The inner diameter of the protective pipe 21 is provided so that in the state of the power cables 17 and 18 being disposed as described, prescribed gaps (gaps allowing the insertion of the power cables 17 and 18 in the protective pipe 21) are formed between the power cables 17 and 18 and the protective pipe 21.

Next, the method of assembling the power cable assembly 20 is explained.

First, as shown in FIGS. 9A and 9B, along with attaching the motor connector 25 to one end portion of the motor power cables 17, the protective tube 22 is attached from one end portion of the motor power cables 17 over a predetermined range.

When doing so, one end side of the motor power cables 17 is inserted inside of partitioned pipe 21b. The motor connector 25 side end portion of this partitioned pipe 21b is covered by the end portion of the protective tube 22 on the opposite side of the motor connector 25. Caulking ring 22c is fitted at the outer periphery of the braided shield 22a of the protective tube 22. The caulking ring 22c is caulked on the entirety of the portion covered by the caulking ring 22c, fixing and joining the partitioned pipe 21b and the protective tube 22.

Along with attaching the compressor connector 30 to one end of the compressor power cables 18, a protective tube 23 is attached over a predetermined range from one end of the compressor power cables 18.

The braided shield 23a extending from the end of the protective tube 23 on the opposite side of the compressor connector 30 is gathered together, and rigid terminal 36 is attached to its tip.

Figure 10:
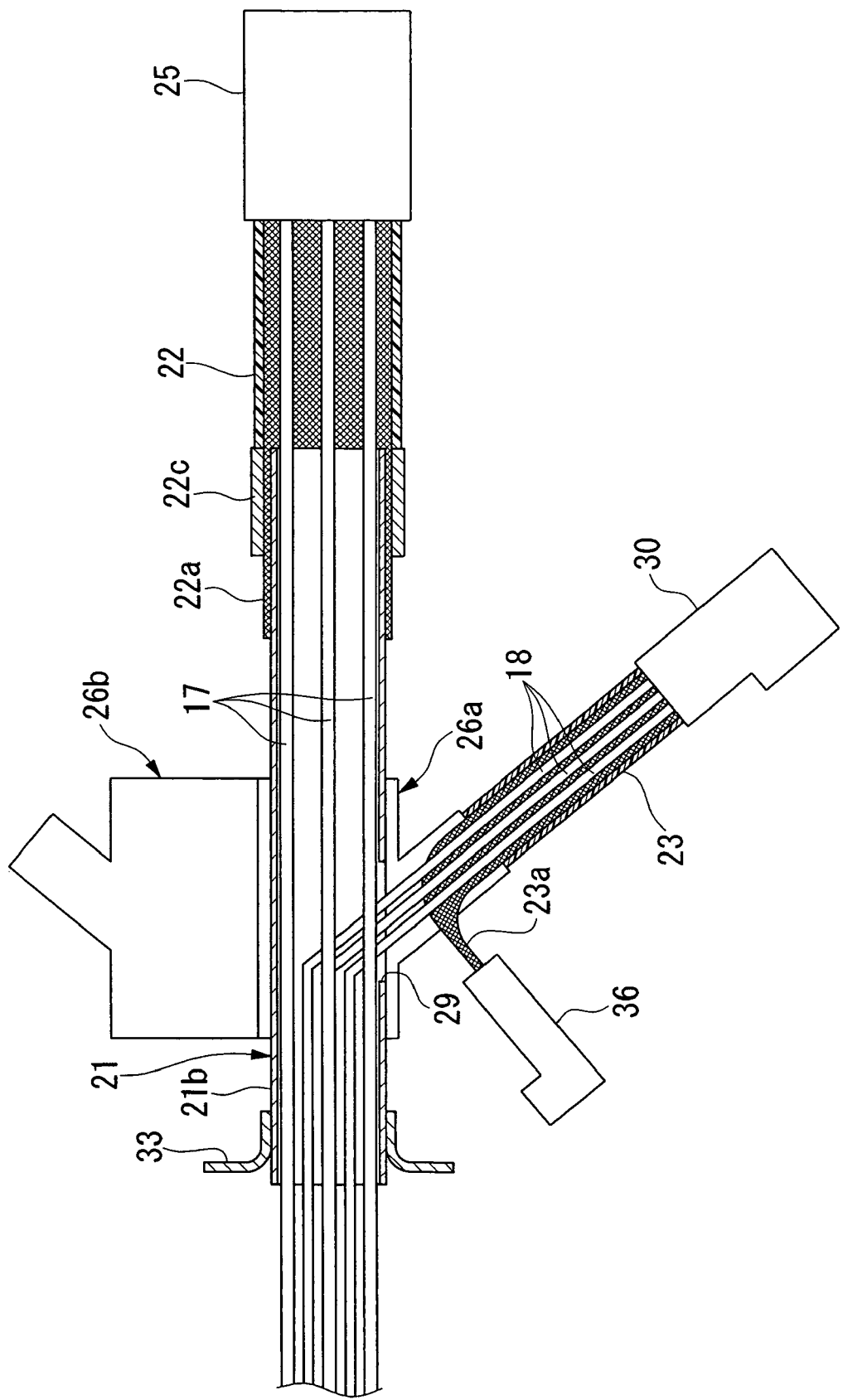
FIG. 10 is a second diagram showing the procedure for assembling the power cable assembly.

Next, as shown in FIG. 10, the other end sides of the compressor power cables 18 (opposite side of the connector 30) are inserted inside the partitioned pipe 21b from the opening 29 and led together with the motor power cables 17 from the cabin 13 side end portion of the partitioned pipe 21b. In this way, after the compressor power cables 18 are branched off from the opening 29 in the partitioned pipe 21b, the branch start portion area is set in one holder half 26a of the holder 26.

Both holder halves 26a and 26b are fit together, fixing the holder 26 so as to sandwich the branch start area. Then, as shown in FIG. 11, the other end side of the power cables 17 and 18 (the side drawn from the cabin 13 side of the partitioned pipe 21b) are inserted in the protective pipe body 21a, and the flange bracket 34 of the protective pipe body 21a and the flange bracket 33 of the partitioned side of the partitioned pipe 21*b* are abutted. By bolt/nut fastening the flange brackets 33 and 34, the protective pipe body 21*a* and the partitioned pipe 21*b* are integrally connected.

At this time, the rigid terminal 36 attached to the braided shield 23*a* drawn out from the shield passage hole 35 of the branch 28 of the holder 26 is secured to the flange brackets 33 and 34 together. This enables fastening of the rigid terminal 36 to the vehicle body via the retaining bracket 31.

At this point, the protective pipe body 21*a* is in a straight condition with no bending work applied, and the power cables 17 and 18 are inserted inside in the state of being disposed as shown in FIG. 8.

At this time, terminals and a connector are not provided on the other end side (cabin 13 side) of the power cables 17 and 18. Accordingly, the inner diameter of the protective pipe body 21*a* (protective pipe 21) is just large enough for formation of prescribed gaps that should allow passage of the power cables 17 and 18 in the protective pipe body 21*a* in the state of the power cables 17 and 18 arranged as shown in FIG. 8.

In the state of the power cables 17 and 18 led out from the other end side of the protective pipe body 21*a*, bending work is applied to both the power cables 17 and 18 and the protective pipe body 21*a*, and as shown in FIG. 3, the protective pipe 21 is formed to follow its laying route. Upon completion of the bending work, assembling of the power cable assembly 20 is finished by adjusting the lengths of the power cables 17 and 18 led out from the other end side of the protective pipe 21 and connecting the terminals 37 and the connector 38 to the tips of the cables.

The power cable holding structure for a vehicle in the embodiments is used in the hybrid electric vehicle 1 having the engine 3 for traveling and driving and the motor generator 4, the electric compressor 9 and the invertors 8 and 10 that perform rotation control of the motor generator 4 and the electric compressor 9, respectively. The motor power cables 17 connecting the motor generator 4 and the motor inverter 8 and the compressor power cables 18 connecting the compressor 9 and the compressor inverter 10 are constituted to be held in the state of being inserted in the metal protective pipe 21. The motor generator 4 and the electric compressor 9 are disposed in the engine compartment 2 and the inverters 8 and 10 are disposed outside the engine compartment 2. The power cables 17 and 18 are run along the undersurface of the floor 19. The motor power cables 17 have a larger outer diameter than the compressor power cables 18, and the compressor power cables 18 are disposed in the gaps between the outer surface of the motor power cables 17 and the inner surface of the protective pipe 21. In other words, in the protective pipe 21, each of the plurality (three in the present embodiments) of compressor power cables 18 being of a smaller diameter than the motor power cables 17 are disposed so as to come into contact with the outer periphery of two among the bundled plurality (three corresponding to each of the phases of a three-phase motor in the present embodiments) of the motor power cables 17 (that is, the surface as seen from the outside in the bundled state).

According to this constitution, the power cables 17 and 18 having different outer diameters can be efficiently disposed in the protective pipe 21, thereby enabling the size of the protective pipe 21 to be minimized.

Insertion of the power cables 17 and 18 in the metal protective pipe 21 allows the power cables 17 and 18 to be run along the undersurface of the floor 19 in the space under the floor (cabin exterior space). In other words, the power cables 17 and 18 are protected from flying rocks and water by the protective pipe 21, and flexure of the power cables 17 and 18 due to self weight and vibrations is prevented by the protective pipe 21, which has rigidity. In addition, the protective pipe 21 protects the power cables 17 and 18 from heat damage by shutting out external heat.

Moreover, the metal protective pipe 21 has an electromagnetic shielding function, thereby enabling the adoption of nonshielded cables as the power cables 17 and 18.

Consequently, reduction in size and weight of the protective pipe 21 is possible. Also, laying the power cables 17 and 18 under the floor enhances workability when installing the power cables 17 and 18 and prevents cramping of the cabin space. Moreover, adoption of nonshielded cables allows for reduction in size and weight of the power cables 17 and 18.

Regarding the aforementioned power cable holding structure for a vehicle, in the engine compartment 2, the motor power cables 17 are inserted in a flexible protective tube 22 in a prescribed range from the motor generator 4 and the compressor power cables 18 are similarly inserted in a flexible protective tube 23 in a prescribed range from the electric compressor 9. In the electric compressor 9 side among this, the opening 29 is provided in the middle section of the protective pipe 21 in the engine compartment 2, the compressor power cables 18 branch off from the opening 29, and the branched compressor power cables 18 have the constitution of being inserted in the protective tube 23.

The aforementioned constitution enables the easy routing of the power cables 17 and 18 near the motor generator 4 or the electric compressor 9 in the engine compartment 2. In addition, dimensional errors from laying of the power cables 17 and 18 can be absorbed, so the laying workability of the power cables 17 and 18 can be enhanced.

Moreover, transmission of vibrations from the engine 3 and the like to the protective tube 21 can be prevented, thereby minimizing the strength rigidity of the protective pipe 21 to allow weight saving.

Regarding the aforementioned power cable holding structure for a vehicle, the resin protective tubes 22 and 23 in which the power cables 17 and 18 are inserted have on their inner circumference braided shields 22*a* and 23*a* formed by braiding of metallic wire, thereby imparting an electromagnetic shielding function to the protective tubes 22 and 23. This enables the adoption of nonshielded cables as the power cables 17 and 18, allowing for a reduction in size and weight.

Regarding the aforementioned power cable holding structure for a vehicle, by sealing the gap between the opening 29 of the protective pipe 21 and the compressor power cables 18 that branch off from the opening 29 and providing the holder 26 that holds the branch start portion of the branched compressor power cables 18, the seal within the protective pipe 21 is maintained, and the branch start portion of the compressor power cables 18 does not come into contact with the rim of the opening 29.

The compressor power cables 18 can be branched without impairing the electromagnetic shielding function of the protective pipe 21. Also, damage to the branch start portion of the compressor power cables 18 can be surely prevented.

Regarding the aforementioned power cable holding structure for a vehicle, the protective tube 23 in which the compressor power cables 18 are inserted has the braided shield 23*a* inside, and the rigid terminal 36 is provided at the end of the braided shield 23*a*. By fastening the rigid terminal 36 to the portion fixed to the vehicle body of the protective pipe 21 via the shield passage hole 35 provided in the holder 26, the compressor power cables 18 can be surely grounded via the braided shield 23*a* in the protective tube 23, enabling good grounding of the power cables 18.

As a method of assembling the power cable assembly 20 for a vehicle that makes possible the aforementioned power cable holding structure for a vehicle, connectors 25 and 30 are attached to one end portion of the power cables 17 and 18, respectively, while the other end side of the power cables 17 and 18 are inserted inside the protective pipe 21 from one end side. Inside the protective pipe 21, the compressor power cables 18 of a small outer diameter are disposed in the gaps between the outer surface of the motor power cables 17 of a large outer diameter and the inner surface of the protective pipe 21. In the state of the other end side of the power cables 17 and 18 led out from the other end side of the protective pipe 21, after bending work is applied to the protective pipe 21 along its laying route, the lengths of the other end portions of the power cables 17 and 18 are adjusted, and the terminals 37 and the connector 38 are attached.

With this constitution, the power cables 17 and 18 with different external diameters are efficiently disposed in the protective pipe 21, allowing the size of the protective pipe 21 to be minimized. In addition, inserting the power cables 17 and 18 in the metal protective pipe 21 enables the power cables 17 and 18 to be run along the space under the floor. Furthermore, nonshielded cables can be adopted as the power cables 17 and 18.

Because the power cables 17 and 18 are inserted in the protective pipe 21 when in a straight state before applying bending work, insertion of the power cables 17 and 18 is easy even when the protective pipe 21 is long. After bending work is applied to the protective pipe 21 in the state with the power cables 17 and 18 inserted, length adjustment is made at the other end section of the cables 17 and 18 and the terminals 37 and the connector 38 are attached, so that there is no shifting of the lengths of the power cables 17 and 18 with respect to the protective pipe 21 due to bending work of the protective pipe 21. In addition, since the other end portions of the power cables 17 and 18 are inserted in the protective pipe 21 in the state of the terminals 37 and the connector 38 not attached, the protective pipe 21 may be a size that allows insertion of the power cables 17 and 18 without consideration to insertion of the terminals.

This enables the easy insertion of the power cables 17 and 18 even when the protective pipe 21 is long. Also, the lengths of the power cables 17 and 18 led out from the protective pipe 21 can be optimally set without being affected by the bending work of the protective pipe 21. In addition, the size of the protective pipe 21 can be minimized, thereby allowing for a reduction in size and weight of the protective pipe 21.

This invention is not limited to the aforementioned embodiments. For example, nonshielded cables were adopted as the power cables 17 and 18, but shielded cables having a conductor, insulator, and electromagnetic shielding wire can also be used. In this case, since the protective pipe 21 also has an electromagnetic shielding function, noise control performance is further enhanced. Also, nonshielded and shielded cables may be used together. The protective pipe 21 is not limited to a circular pipe, and may be an elliptical or square pipe and the like. Even if metal corrugated tubes made iron and the like are used in place of resin protective tubes 22 and 23 having braided shields 22a and 23a, the same operation and effect can be obtained as when protective tubes 22 and 23 are used.

When shifting in the lengths of the other end portions of the power cables 17 and 18 can be allowed, adjustment of the lengths of the other end portions of the power cables 17 and 18 prior to attaching terminals such as the terminals 37 and the connector 38 to the power cables 17 and 18 can be omitted.

The present invention is not limited to hybrid electric vehicles, and can also be applied to electric vehicles whose power source is a motor only. Moreover, the power cables may be high voltage cables or low voltage cables, that is, it is also applicable to a low voltage cable holding mechanism connecting a DC/DC converter (power transformer) and a low voltage battery (such as a 12 V battery).

Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A power cable holding structure for a vehicle, comprising:
   power cables having at least two different outer diameters and including at least two cables for each outer diameter; and
   a metal protective pipe in which the power cables are inserted,
   wherein, in the protective pipe, the power cables having a small outer diameter are disposed in the gaps between the outer surface of the power cables having a large outer diameter and the inner surface of the protective pipe.

2. A power cable holding structure for a vehicle used in a vehicle that is optionally powered by electricity, comprising:
   an engine and a motor for traveling and driving;
   an electric compressor;
   a first electrical power converter for rotation control of the motor; and
   a second electrical power converter for rotation control of the electric compressor;
   wherein said power cable holding structure for a vehicle comprises:
   motor power cables that connect the motor disposed in an engine compartment and the first electrical power converter disposed outside the engine compartment and are lain along the undersurface of a floor;
   compressor power cables with a smaller outer diameter than the motor power cables, that connect the electric compressor disposed in the engine compartment and the second electrical power converter disposed outside the engine compartment and are lain along the undersurface of the floor; and
   a metal protective pipe in which the motor power cables and the compressor power cables are inserted,
   wherein, in the protective pipe, the compressor power cables are disposed in the gaps between the outer surface of the motor power cables and the inner surface of the protective pipe.

3. The power cable holding structure for a vehicle according to claim 2, further comprising: a flexible protective tube in which the motor power cables are inserted in a prescribed range from the motor in the engine compartment.

4. The power cable holding structure for a vehicle according to claim 2, further comprising: a flexible protective tube in which the compressor power cables are inserted in a prescribed range from the electric compressor in the engine compartment.

5. The power cable holding structure for a vehicle according to claim 2, wherein an opening is provided in the middle section of the protective pipe in the engine compartment,
   the engine compartment side of the compressor power cables from the middle section in the engine compartment is drawn to the outside of the protective pipe through the opening, and
   a flexible protective tube that can pass the compressor power cables is provided outside the protective pipe.

6. The power cable holding structure for a vehicle according to claim 3, wherein the protective tube is a resin tube provided with a metal corrugated tube on its inner surface.

7. The power cable holding structure for a vehicle according to claim 3, wherein the protective tube is a resin tube provided with a metal braided shield on an inner surface thereof.

8. The power cable holding structure for a vehicle according to claim 4, wherein the protective tube is a resin tube provided with a metal corrugated tube on an inner surface thereof.

9. The power cable holding structure for a vehicle according to claim 4, wherein the protective tube is a resin tube provided with a metal braided shield on an inner surface thereof.

10. The power cable holding structure for a vehicle according to claim 5, wherein the protective tube is a resin tube provided with a metal corrugated tube on an inner surface thereof.

11. The power cable holding structure for a vehicle according to claim 5, wherein the protective tube is a resin tube provided with a metal braided shield on an inner surface thereof.

12. The power cable holding structure for a vehicle according to claim 5, further comprising: a holder that seals the gap between the opening and the compressor power cables and holds the compressor power cables near the opening.

13. The power cable holding structure for a vehicle according to claim 12, wherein the resin tube has a braided shield on an inner surface thereof;
 a shield passage hole that passes the braided shield is provided at the holder; and further comprising:
 a rigid terminal provided at the tip of the braided shield, inserted in the shield passage hole and fastened to the protective pipe.

14. A method of assembling a power cable assembly for a vehicle, comprising the steps of:
 attaching first connectors to one end of each of power cables having at least two different outer diameters and including at least two cables for each outer diameter;
 inserting the other end of each of the power cables inside protective pipe from one end side;
 disposing the small diameter power cables in the protective pipe in the gaps between the outer surface of the large diameter power cables and the inner surface of the protective pipe; and
 in the state of the other end of each of the power cables drawn out from the other end side of the protective pipe, after applying bending work to the protective pipe so as to follow a laying route, adjusting the lengths with respect to the other end of each of the power cables and attaching second terminals.

* * * * *